United States Patent [19]

Kolossow

[11] 4,431,311
[45] Feb. 14, 1984

[54] EXTRUSION APPARATUS FOR THE PRODUCTION OF FOAMED SYNTHETIC MATERIAL

[75] Inventor: Klaus-Dieter Kolossow, Hamburen, Fed. Rep. of Germany

[73] Assignee: Hermann Berstorff Maschinenbau GmbH, Hanover, Fed. Rep. of Germany

[21] Appl. No.: 307,173

[22] Filed: Sep. 30, 1981

[30] Foreign Application Priority Data

Oct. 10, 1980 [DE] Fed. Rep. of Germany ....... 3038306

[51] Int. Cl.³ .............................................. B01F 1/00
[52] U.S. Cl. ........................................ 366/79; 366/91; 366/144; 366/366; 425/208; 425/131.1; 264/171; 264/45.9
[58] Field of Search ........................ 366/79, 80, 81, 82, 366/87, 89, 91, 98, 99, 144, 336, 337; 425/4 C, 205, 208, 131.1, DIG. 817 C; 264/171, 45.9, 53, 211, DIG. 83, 51, 37, 565, 177 R

[56] References Cited

U.S. PATENT DOCUMENTS

| | | | |
|---|---|---|---|
| 3,588,955 | 6/1971 | Azuma | 264/53 |
| 3,613,160 | 10/1971 | Loomans | 425/209 |
| 3,745,200 | 7/1973 | Geyer | 425/205 |
| 4,324,493 | 4/1982 | Colombo | 366/79 |

FOREIGN PATENT DOCUMENTS 714437 7/1965 Canada ............................... 366/336

Primary Examiner—Stephen Marcus
Assistant Examiner—John Kwon
Attorney, Agent, or Firm—Schwartz, Jeffery, Schwaab, Mack, Blumenthal & Koch

[57] ABSTRACT

In the production of foamed thermoplastic synthetic material, synthetic material is melted in a screw extruder and fluid propellant is injected into the molten sythetic material. The residence time of the molten mixture has a determining effect in regard to uniform distribution of the propellant and thus also in regard to the uniformity of the cell structure. In order to provide for homogeneous mixing of the propellant and uniform cooling of the molten mixture, without using an excessively long screw extruder, the screw extruder is provided, downstream of a melting region thereof and of an injection opening thereof through which propellant is introduced, with flow obstruction structure which is by-passed by static mixing structure disposed outside the screw extruder. The molten synthetic material is simultaneously mixed with the propellant and cooled in the static mixing structure.

3 Claims, 3 Drawing Figures

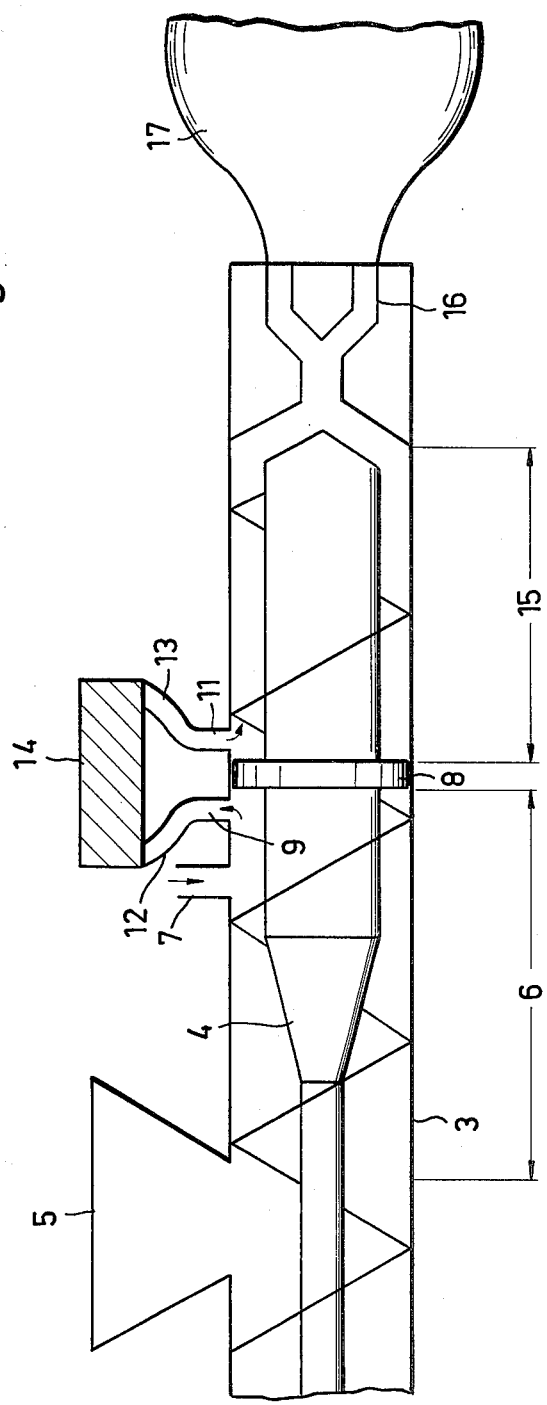

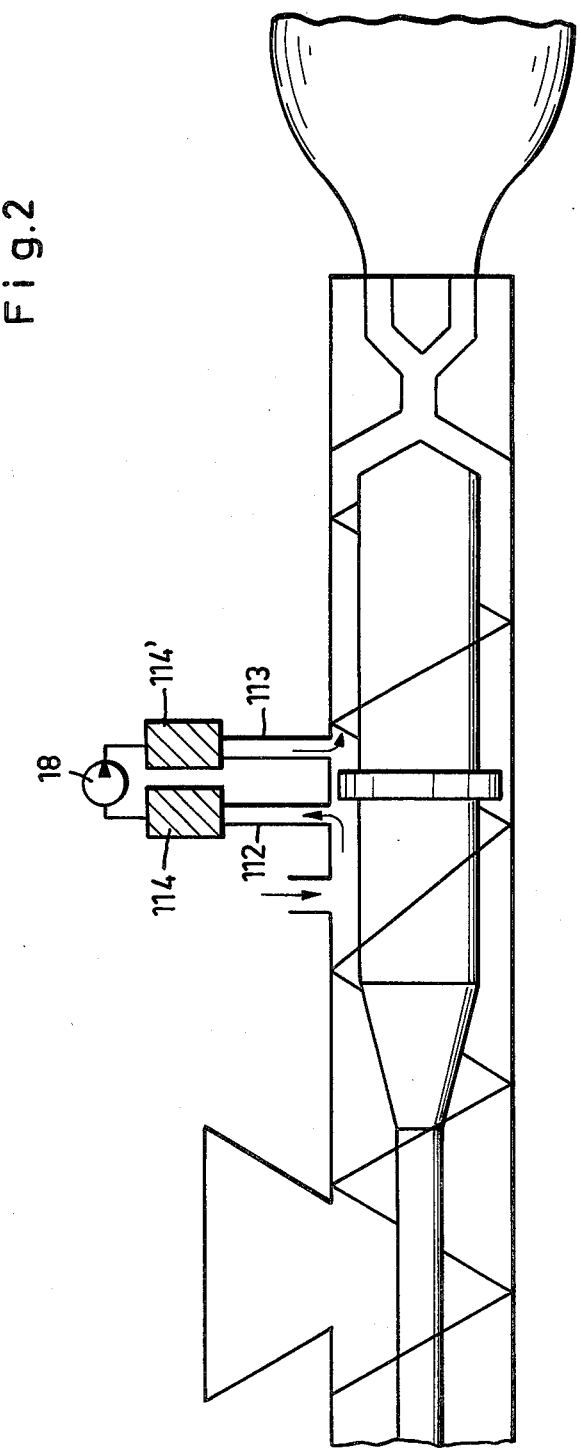

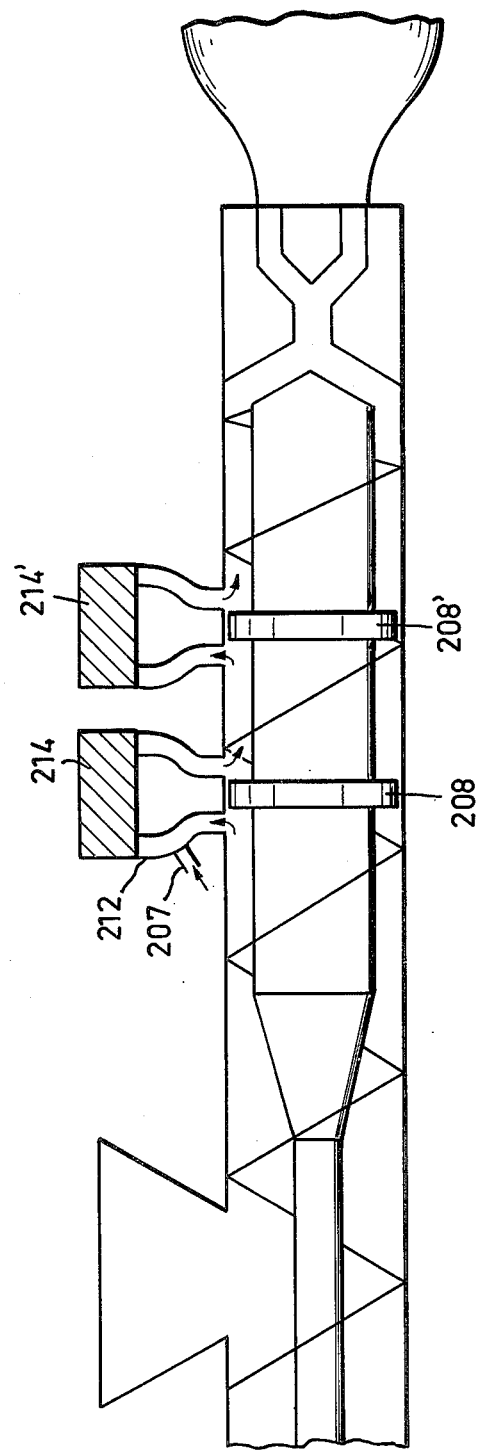

EXTRUSION APPARATUS FOR THE PRODUCTION OF FOAMED SYNTHETIC MATERIAL

It is known for foamed material comprising thermoplastic synthetic materials to be produced by extrusion in such a way that the synthetic material is melted in a screw extruder. The fluid propellant is then injected into the molten synthetic material. In the language used in the art, this mode of operation is referred to as the direct gassing process.

The fluid propellant which is injected directly into the molten synthetic material must be mixed in the screw extruder to form a really homogeneous mixture of synthetic material and propellant. In order to avoid the molten synthetic material foaming up in the extruder, and to avoid the synthetic material being at an excessively high outlet temperature, the molten material must be kept under pressure and uniformly cooled. The molten mixture is ejected and foams up after ejection. In order to achieve good mixing in respect of the propellant and uniform cooling of the molten material, hitherto a comparatively long mixing and cooling section had to be provided in the screw extruder. For this reason therefore, the screw extruder for the production of foamed materials from thermoplastic synthetic materials using the direct gassing process was comparatively long.

The invention has among its objects to provide mixing and cooling means for homogeneously mixing a propellant and uniformly cooling the molten material, which permits the length of the screw extruder to be reduced.

According to the invention, there is provided extrusion apparatus for producing foamed thermoplastic synthetic material comprising a screw extruder having a melting region for melting synthetic material, means for injecting propellant into the molten material and, downstream of the melting region, flow obstruction means by-passed by static mixing means disposed outside the screw extruder.

The static mixing means which is connected as a by-pass device produces homogeneous mixing of the injected propellant in the molten synthetic material. Static mixing means are known per se and are freely available commercially. Disposing the separate static mixing means in the by-pass around the flow obstruction means in the screw extruder can permit a considerable reduction in the length of the screw extruder since the screw extruder itself does not then have to have a special length for mixing and cooling means and only requires a relatively short cooled ejection region. The static mixing means has the effect of a heat exchanger on the molten mixture.

In an advantageous embodiment of the invention, a gear pump is associated with the static mixing means. An increase in pressure in the molten mixture passing through the static mixing means can be produced by way of the gear pump. This can be advantageous in certain circumstances, in order to compensate for the pressure drop caused by the static mixing means or to increase the pressure in the molten mixture. Premature foaming of the foamable synthetic material is avoided.

In another advantageous embodiment of the invention, the screw extruder has a plurality of flow obstruction means which are arranged in axial succession and which are each by-passed by respective static mixing means disposed outside the screw extruder. This repeated arrangement of the basic confuration of the invention advantageously produces an increase in the residence time of the molten mixture in the screw extruder. However, an increased residence time simultaneously provides for better mixing of the propellant and uniform distribution of temperature in the molten mixture, which can result in a more uniform cell structure in the extruded plastics foam.

The invention can permit the extrusion of synthetic foam of the highest quality in regard to uniform cell structure, while the screw extruder used can be substantially shorter than hitherto.

The invention is diagrammatically illustrated by way of example with reference to the accompanying drawings, in which:

FIG. 1 is a diagrammatic view of a first embodiment of extrusion apparatus according to the invention comprising a screw extruder having a static mixing means by-passing a flow obstruction means;

FIG. 2 shows a modification of the apparatus of FIG. 1 wherein static mixing means operates in conjunction with a gear pump; and FIG. 3 shows a further embodiment of extrusion apparatus according to the invention having two flow obstruction means.

Referring to the drawings and firstly to FIG. 1, a screw extruder has a screw cylinder 3 and an extruder screw 4. Synthetic material to be melted, for example polystyrene in the form of a granulate with the addition of pore forming agents, is supplied to the screw extruder by way of a filling hopper 5. The driven, rotating extruder screw 4 has a conveying and melting action on the synthetic material introduced, in known manner, so that the synthetic material becomes plastic in a melting region 6. At the end of the melting region 6, a fluid propellant is injected in metered quantities into the molten synthetic material under high pressure, by way of an injection opening 7. Downstream of the location of the injection opening 7, as viewed in the direction of conveying movement, a flow obstruction ring 8 which blocks off the cylinder bore is disposed on the extruder screw 4. Disposed upstream of the flow obstruction ring 8 in an outlet opening 9, and downstream of the flow obstruction ring 8 is an inlet opening 11, the openings 9 and 11 being connected by way of tube conduits 12 and 13 to an inlet and an outlet respectively of a coolable static mixer 14.

A cooling and ejection region 15 adjoins the flow obstruction ring 8. Disposed at the output end of the screw extruder is an annular extrusion opening 16 through which the propellant-bearing molten synthetic material is extruded. Downstream of the extrusion opening 16, the polystyrene melt expands to form a foam having a regular cell structure. The foam tube 17 produced is blown into the form of a tubular film or foil, by per se known blowing means.

The molten synthetic material with the injected propellant is forced through the conduit 12 into the cooled static mixing means 14, by virtue of the conveying action of the extruder screw 4. When the molten synthetic material passes through the static mixing means 14, it is continuously rolled over and turned over in layers so that the propellant is homogeneously mixed in the molten synthetic material and the molten matieral issues from the static mixing means 14 in a uniformly cooled condition. The molten mixture is reintroduced into the screw extruder, downstream of the ring 8, by way of the conduit 13. The following screw section 15 further mixes and cools the molten synthetic material, and builds up the pressure required for the extrusion operation.

FIG. 2 shows a modified embodiment of the static mixing means. The conduits 112 and 113 representing the feed to and the discharge from the mixing means are each connected to a respective cooled static mixing means 114 and 114' respectively which are connected together by way of a gear pump 18. The gear pump 18 serves to convey the molten synthetic material and increase the pressure thereof, as it flows through the static mixing means 114'.

FIG. 3 shows a further embodiment of the extrusion apparatus. The screw extruder has two flow obstruction rings 208 and 208' which are disposed in axial succession and which are each bypassed by a respective cooled static mixing means 214 and 214' respectively. The fluid propellant is injected into the molten synthetic material in metered quantities, by way of an injection opening 207 in a first conduit 212 leading to the first static mixing means 214. Passing the material through a static mixing means twice provides a longer residence time for the molten synthetic material in the extrusion apparatus.

What is claimed is:

1. An extrusion apparatus for producing foamed thermoplastic synthetic material, comprising:
    a screw extruder having a melting region for producing molten synthetic material, and a cooling and ejecting region downstream of the melting region;
    means positioned near a downstream end of the melting region for injecting a propellant into the molten material; p1 flow obstruction means positioned downstream of the injecting means and between the melting region and the cooling and ejecting region; and
    a passage for by-passing the flow obstruction means and having disposed therein a static mixing means for mixing said propellant and molten material.

2. The extrusion apparatus claimed in claim 1 further comprising further flow obstruction means disposed in axial succession to said flow obstruction means and further static mixing means bypassing said further flow obstruction means and disposed outside said screw extruder.

3. An extrusion apparatus for producing foamed thermoplastic synthetic material, comprising:
    a screw extruder having a melting region for producing molten synthetic materials and a cooling and ejecting region downstream of the melting region;
    means positioned near a downstream end of said melting region for injecting a propellant into said molten material;
    flow obstruction means positioned downstream of the injecting means and between said melting region and said cooling and ejecting region;
    a passage for by-passing said flow obstruction means and having disposed therein first and second static mixing means for mixing said propellant and said molten material; and
    a gear pump for conveying said molten material and propellent between said first and second static mixing means.

* * * * *